Oct. 7, 1930.  W. N. GILBERT  1,777,881
SCALE
Filed Oct. 31, 1927   2 Sheets-Sheet 1
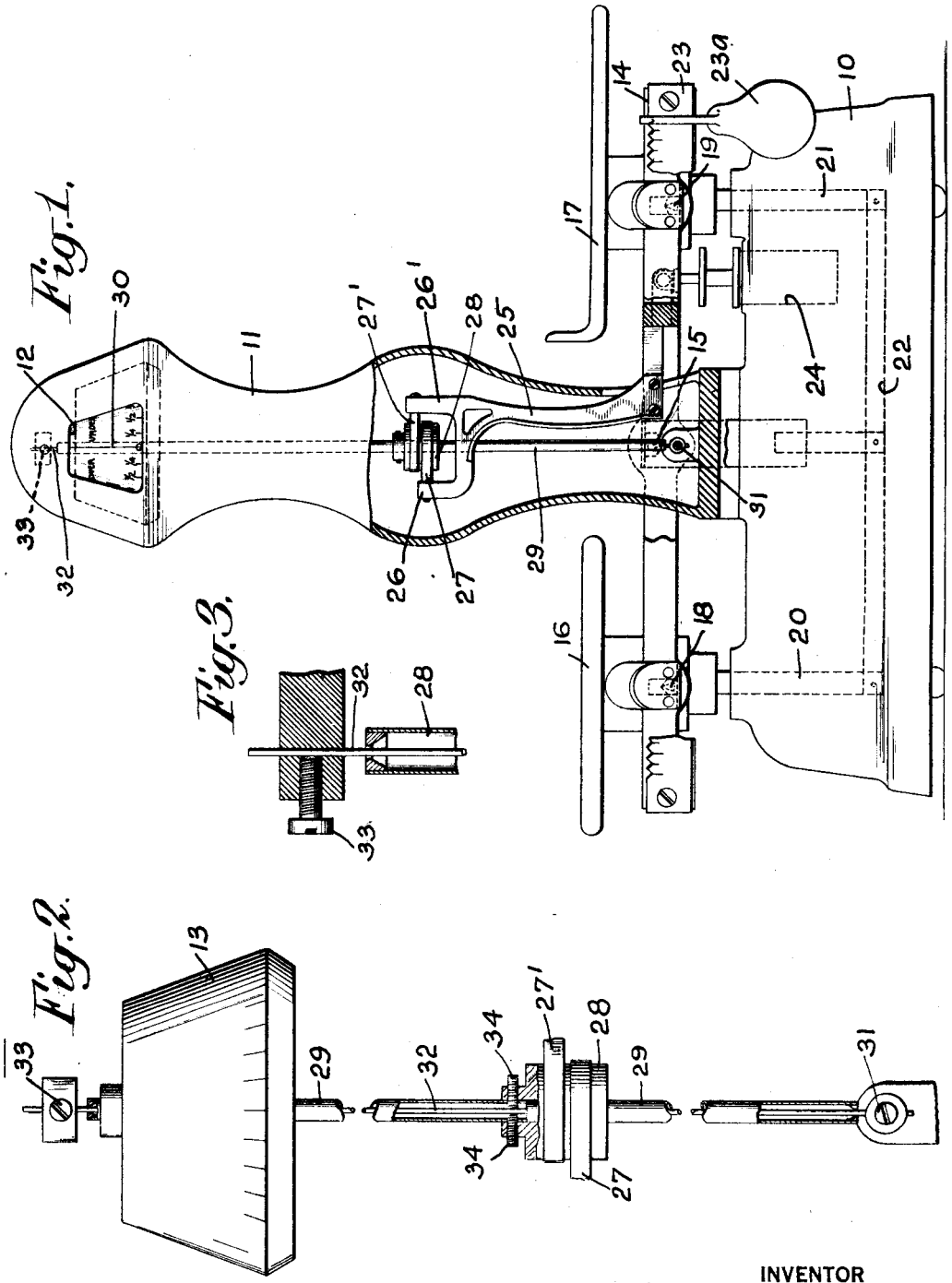
INVENTOR
William N. Gilbert
BY
*A. C. Maby*
ATTORNEY Oct. 7, 1930.   W. N. GILBERT   1,777,881
SCALE
Filed Oct. 31, 1927   2 Sheets-Sheet 2
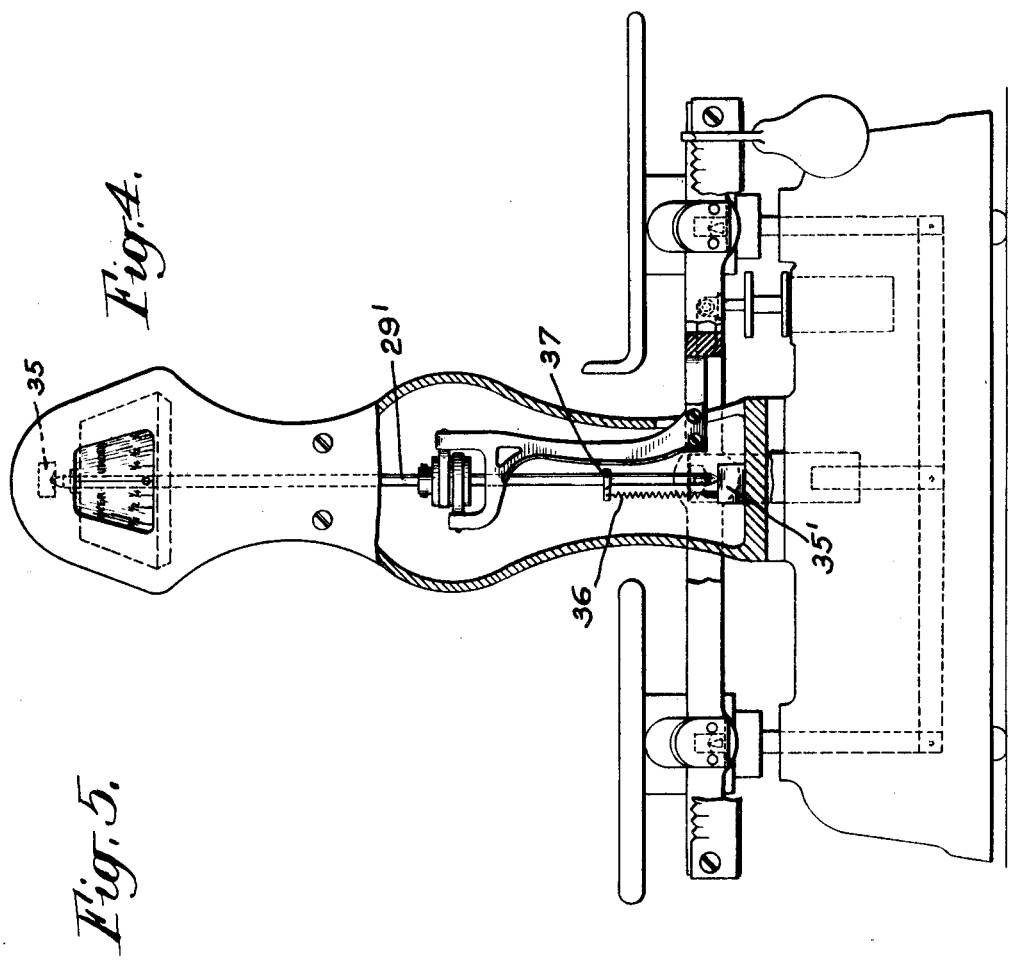
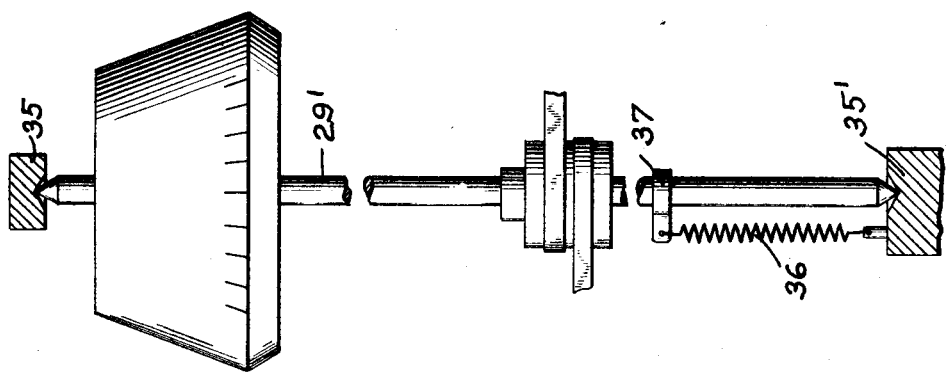
INVENTOR
William N. Gilbert
BY
ATTORNEY Patented Oct. 7, 1930

1,777,881

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

SCALE

Application filed October 31, 1927. Serial No. 229,925.

This invention relates to scales and more particularly to even balance scales of the over and under type.

An object of my invention is to provide a scale of the above type for indicating slight over and under weights by means of a rotatable drum.

Another object is to provide a scale of the above type wherein the accuracy of the scale will not be affected by the scale base being out of level.

Another object is to provide an even balance scale having resilient means for holding the drum in zero position with respect to an index mark or wire.

Another object is to provide an even balance scale having the drum carrying an index chart mounted directly on a rotatable shaft provided with a torsion mechanism to hold the drum in zero position and return it to zero position when it is displaced and in which the torsion mechanism serves as auxiliary load offsetting means to offset small amounts of over and under weights.

Another object is to provide a scale of the above type including torsion means which are normally free of tension.

A further object is to provide new and improved motion multiplying means between an indicator and scale beam in scales of the above type.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the accompanying drawings I have shown for the purpose of illustration one form of mechanism with certain modifications thereof embodying the invention in which Fig. 1 is a front elevation of my scale with certain parts shown in section.

Fig. 2 is an enlarged detail of the drum and means for rotating same.

Fig. 3 is an enlarged side detail of the manner in which the torsion wire is fixed to the scale.

Fig. 4 is a modified form of the scale shown in Fig. 1.

Fig. 5 is an enlarged detail of the drum and means for rotating same as shown in Fig. 4.

The preferred form of the invention contemplates an even balance scale in which a drum carrying an index chart and mounted on a vertical shaft cooperates with an index wire or mark on the scale casing. The shaft carrying the drum has connected thereto torsion means by which the drum and shaft is held in zero position at all times irrespective of the level of the scale base and which also forms a load offsetting means by which slight over and under weights may be accurately indicated on the drum.

Referring to Fig. 1 the scale includes a base or support 10, a casing 11 with an aperture 12, and a beam 14 fulcrumed on knife edges 15. A platform or plate 16 upon which counter weights may be placed is mounted on one end of the scale beam and a similar platform or plate 17 on which commodities to be weighed may be placed is mounted on the opposite end thereof. These two plates are mounted in the well known manner on knife edges 18 and 19 and carry downwardly extending stems 20 and 21 which are pivotally connected to a check rod 22 which retains them in parallel positions at all times. The scale is provided with the usual tare beam 23 and slidable tare poise 23ª and also with the usual dash pot 24 for damping oscillations of the scale beam.

Fixed on the balance beam 14 is a bracket 25 having two vertically extending arms 26 and 26' which have fixed thereto a pair of steel tapes 27 and 27' respectively (Figs. 1 and 2). The tapes 27 and 27' are anchored at their opposite ends about a sector or hub 28 fixed on a tubular shaft 29 and are so arranged as to rotate the shaft 29 in accordance with the movement of the balance beam 14. A drum 13 carrying an index chart is fixed on the upper end of the shaft 28 and coacts with an indicating wire 30. Owing to the length of the bracket 25 and the fact that the radius of the drum 13 is considerably greater than that of the sector or hub 28 with which the tapes 27 and 27' coact, a substantial multiplication of the movement of the scale beam is effected by which slight over or under weights may be indicated on the index chart.

Fixed with respect to the scale base 10 by means of a set screw 31 (Fig. 2) and extending through the tubular portion of the vertical extending shaft 28 is a torsion wire 32 anchored at its opposite end by a screw 33 (Figs. 2 and 3) to the frame of the scale. A plurality of set screws 34 mounted in the hub or sector 28 fasten the sector to the torsion wire so that when the shaft 28 is rotated through the medium of the tapes 27 and 27' and balance beam 14 the wire 32 will be torsioned thus establishing a load offsetting means for accurately indicating slight over and under weights on the drum thereby holding the drum in its normal or zero position with respect to the indicating wire 30 whether the scale is in level or out of level.

Reference will now be had to Fig. 4 wherein a modified form of the invention is illustrated. As will be noted the scale comprises practically the same mechanism as that previously described in connection with Fig. 1 but differs in that the shaft 29' is solid and fulcrumed on bars 35 and 35'. The torsion in this case is provided by an external spring 36 connected at one end to a projection 37 (Figs. 4 and 5) fixed on the shaft and connected at its opposite end to the scale base. This spring is torsioned when the shaft is rotated and tends to hold the shaft and drum in their normal positions irrespective of whether the scale base is level or not and also acts as a load offsetting means by which slight over and under weights may be accurately indicated on the drum of the scale.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. A scale of the even balance type comprising a beam, an indicating drum with torsion means for holding it in zero position and returning it thereto when displaced and multiplying connections intermediate the beam and the drum, said connections including a member rotatable on a vertical axis.

2. A scale of the even balance type comprising a beam, a fixed index, a graduated indicating drum cooperating with said index for indicating out of balance conditions of the beam, the axis of said drum being transverse to the axis of the beam, driving connections intermediate the beam and drum including means normally free of tension with means for tensioning the same when the scale beam moves to out of balance position in either direction.

3. A scale of the even balance type comprising a beam, a fixed index, a graduated indicating drum with its axis transverse to the beam axis and cooperating with said index for indicating out of balance conditions of the beam, driving connections intermediate the beam and drum including a torsion member free of tension when the drum is in zero position and means for tensioning the torsion means when the drum is displaced from zero position.

4. A scale of the even balance type comprising a fulcrumed beam, a torsion member extending angularly to the fulcrumed axis of the beam and movable under stress in a direction angular to the direction of movement of the beam, multiplying connections intermediate the beam and torsion member and an indicator driven by the torsion member.

5. A scale of the even balance type comprising a beam, an elongated arm mounted thereon, an indicator operator with torsion means for holding it in zero position and a flexible connection between the arm and the torsion member to displace the latter on movement of the scale beam from its balance position, said flexible connection extending angularly to said arm at its point of connection thereto.

6. A scale of the even balance type comprising a fulcrumed beam, an elongated arm mounted thereon, an indicator operator including a torsion member normally free from tension and a pair of flexible connections intermediate the arm and the torsion member to positively tension the latter in opposite senses on movements of the beam in opposite directions from its balance position.

7. A scale of the even balance type comprising a beam, a torsion member, an indicator driving sector connected thereto, an elongated arm rigid with the scale beam and flexible connections joining said sector to said arm to tension the torsion member on movement of the scale beam from its balance position.

8. A scale of the even balance type comprising a fulcrumed beam, a shaft carrying an indicator and having its axis extending angularly to the axis of the fulcrum of the scale beam, torsion means tending to return the shaft to zero position when displaced and driving connections intermediate the beam and the shaft for displacing the same on movements of the scale beam out of its balance position.

9. A scale of the even balance type comprising a beam, a hollow shaft for driving an indicator, a tension member within the shaft for resiliently holding it in normal position, a sector fastened to the shaft and the tension member and driving connections intermediate the beam and the sector.

10. A scale of the even balance type comprising a beam, a hollow shaft for driving an indicator, a tension member within the shaft for resiliently holding in it normal position, a sector fastened to the shaft and the tension member and multiplying connections intermediate the beam and the sector.

11. A scale of the even balance type comprising a beam, a shaft for driving an indicator, means for resiliently holding said shaft in normal position and returning it thereto when displaced in either direction, an elongated arm mounted on said beam and driving connections between the arm and the shaft for positively moving it in either direction according to movements of the beam from balance position.

12. A scale of the even balance type comprising a beam, a shaft with an indicator driven thereby, means for resiliently holding said shaft in normal position and tending to return it thereto when displaced, an elongated arm fixed to said beam provided with members extending on opposite sides of said shaft and driving conections intermediate each member and the shaft to positively drive it in either direction on movement of the scale beam.

13. A scale of the even balance type comprising a beam, a hollow shaft for driving an indicator, a torsion member located within the shaft and fastened thereto to resiliently hold the shaft in normal position, a bifurcated arm mounted on the beam having its bifurcations located on opposite sides of the shaft axis and a flexible tape connecting each bifurcation to the shaft to positively drive it on displacements of the beam.

In testimony whereof I hereto affix my signature.

WILLIAM N. GILBERT.